United States Patent [19]

Lee

[11] 4,025,203
[45] May 24, 1977

[54] MIRROR-TYPE BEAM STEERER HAVING A VIRTUAL PIVOT

[75] Inventor: James Kelly Lee, Rochester, N.Y.

[73] Assignee: Eastman Kodak Company, Rochester, N.Y.

[22] Filed: Dec. 11, 1975

[21] Appl. No.: 639,671

[52] U.S. Cl. .............................................. 350/285
[51] Int. Cl.² ......................................... G02F 1/29
[58] Field of Search .............. 350/6, 285; 248/474, 248/476, 479

[56] References Cited

UNITED STATES PATENTS 3,758,199  9/1973  Thaxter ........................... 350/285

FOREIGN PATENTS OR APPLICATIONS 180,787  6/1922  United Kingdom ............... 350/285
194,340  5/1967  U.S.S.R. ............................ 350/285

Primary Examiner—John K. Corbin
Assistant Examiner—F. L. Evans
Attorney, Agent, or Firm—G. E. Grosser

[57] ABSTRACT

A mirror-type beam steering apparatus employs at least one flexible mirror support member having, generally, the shape of the Greek letter lambda. Each such member has a pair of flexible leg sections that slant toward one another and are truncated into an interconnecting section. The diverging ends of the leg sections are fixed and an optical beam steering mirror is mounted to the interconnecting section. With this arrangement, a "virtual pivot" occurs at the intersection of the leg section axis (although the legs themselves do not intersect), and torque components applied to deflect the mirror result in rotation of the mirror about the virtual pivot axis. In preferred forms of the invention, the mirror's center of gravity is located on the virtual pivot axis, thereby reducing the inertial resistance to rotation and improving steerer performance.

9 Claims, 5 Drawing Figures

U.S. Patent    May 24, 1977    Sheet 2 of 2    4,025,203
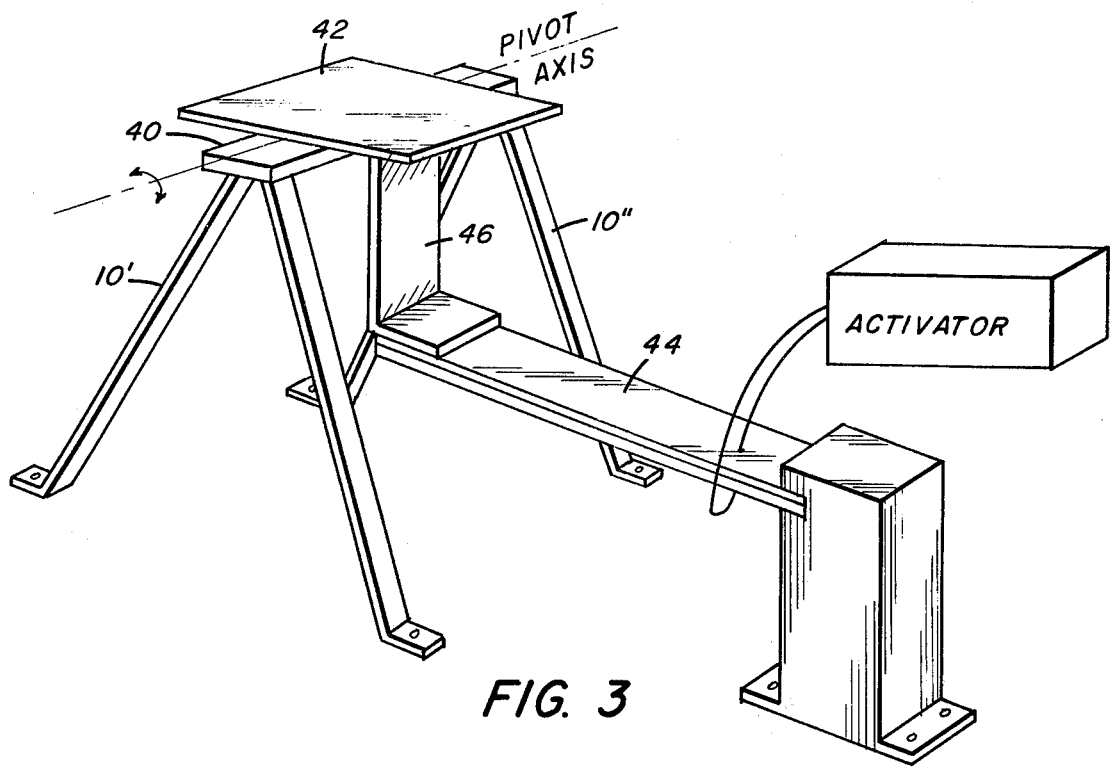
FIG. 3
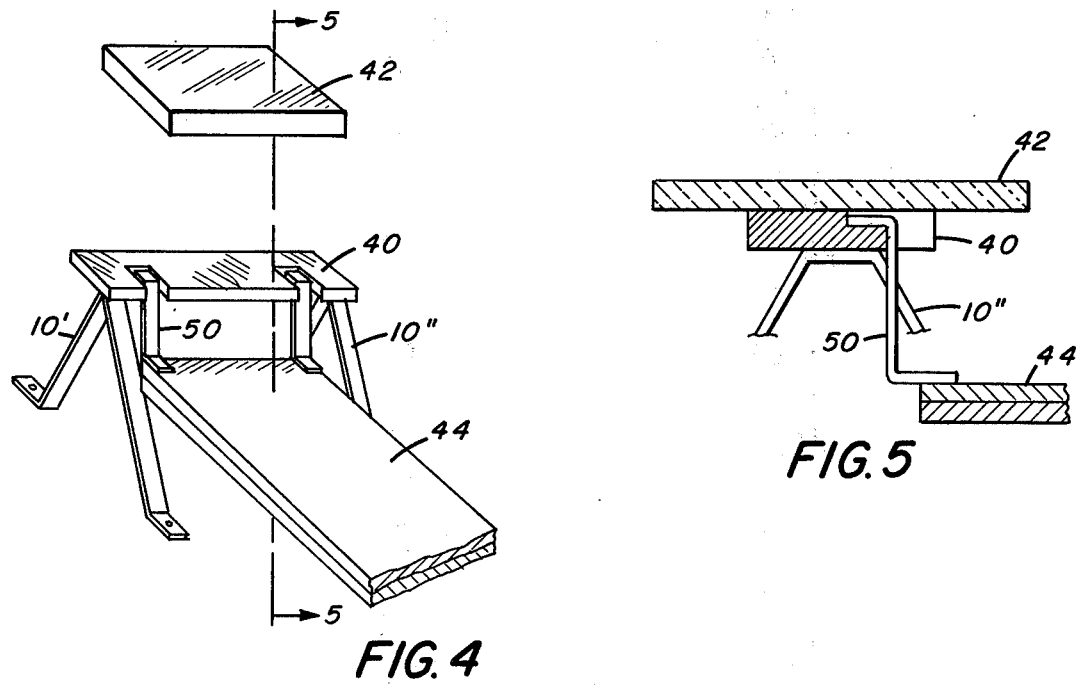
FIG. 4
FIG. 5

MIRROR-TYPE BEAM STEERER HAVING A VIRTUAL PIVOT

BACKGROUND OF THE INVENTION

1. Field of the Invention

The invention relates to high performance optical beam steering apparatus of the type having a scanning mirror which is caused to pivot about an axis by a signal-controlled driver.

2. Description Relative to the Prior Art

Mirror-type beam steerers are well known, for example, in information storage and retrieval apparatus; and various mounting and drive arrangements have been proposed for achieving desired steerer performance characteristics. As is discussed in some detail in U.S. Pat. No. 3,758,199, two important characteristics of beam steerers are speed (bandwidth) and capacity (number of resolvable positions). A parameter which is often used to provide an overall measure of performance is the product of speed and capacity.

One known way to improve the performance of beam steerers is to reduce the inertia of the load (mainly the mirror and mounting) which must be driven, and thereby increase the maximum mirror deflection speed. For example, the thickness (and, hence, the mass) of the mirror may be reduced, but there are practical limits to this approach if the structural integrity of the mirror is to be maintained. The size of the mirror can also be lessened to reduce mirror mass, but a reduction in the reflecting surface area has the undesirable effect of reducing the number of spots which are resolvable. This is because of diffraction effects which limit the resolving power of the scanner system as, for example, is discussed at page 55 of Laser Applications, by Monte Ross, Academic Press, Inc., 1974.

U.S. Pat. No. 3,544,201 to Fowler et al describes an arrangement wherein a mirror is arranged close to the effective rotational axis of a bender-type driver, i.e. a driver which flexes along a longitudinal axis in response to an applied signal, an example being a bimorph driver (see U.S. Pat. No. 3,219,850). By concentrating the load mass close to the rotational axis, inertial resistance to rotation is reduced as, for example, compared to a steerer with the mirror mounted perpendicularly at the tip of the bender.

U.S. Pat. No. 3,479,107 to Blythe et al describes a mounting arrangement utilizing two pivots aligned at opposite edges of a mirror. The pivot axis consequently passes through the mirror itself. A frame is placed around the mirror, apparently to provide support to avoid direct connection of the pivots to the mirror. While being suited to heavy-duty applications, such an arrangement introduces considerable mass as a result of the frame. Moreover, the described pivots would prove difficult to fabricate in small sizes. U.S. Pat. No. 3,166,683 describes a steerer apparatus having two pairs of bender-type drivers, each such pair being in an X-configuration. V-shaped brackets mounted to the tips of the bender pairs are arranged with their vertices at the effective pivot axis of the drivers. By mounting the steerer mirror to a shaft which is connected between such vertices, the mirror is closely aligned with the pivot axis and, consequently, a low level of inertial resistance to rotation may be achieved.

U.S. Pat. application Ser. No. 508,775, filed Sept. 23, 1974, now U.S. Pat. No. 3,981,566, describes a hinged lever-action mirror mounting which, in cooperation with a bender-type driver, affords wide angular ranges for mirror deflection. By arranging a fulcrum hinge of such mountings close to a principal axis of the mirror, a low rotational inertia is achieved.

While, as indicated above, there has been considerable development effort directed toward improving beam steerer performance, the demand for increasingly higher capacity information storage and retrieval devices makes even further improvements highly desirable.

SUMMARY OF THE INVENTION

A mirror-type beam steering apparatus employs at least one flexible mirror support member having, generally, the shape of the Greek letter lambda. Each such member has a pair of flexible leg sections that are angled toward one another and are truncated into an interconnecting section. As employed in beam steerers according to the invention, the diverging ends of the leg sections are fixed and the scanning mirror of the steerer is mounted to the interconnecting section. With this arrangement, a virtual pivot occurs at the intersection of the leg section axes (albeit the leg sections themselves do not intersect) and drive torque applied to deflect the mirror results in essentially rotational motion about the virtual pivot axis. Hence, for steerers according to the invention, a pivotable mirror arrangement is achieved without resorting to joints of the type requiring relative movement (e.g. pin-type hinge joints), which joints tend to introduce play or looseness.

In preferred forms of the invention, the mirror is so arranged that the pivot axis passes through the mirror's center of gravity. And, since the pivot is virtual, there is no physical obstruction (such as a hinge pin) at the pivot axis which might require boring through the mirror or having to resort to edge support thereof. Rather, the back surface of the mirror can be used for mounting purposes, even though the pivot axis is arranged to pass through the mirror.

By so locating the relatively heavy mirror, a minimal inertial load is imposed on the mirror driver because the load mass tends to be concentrated about the pivot axis and, consequently, enhanced steerer performance becomes possible (i.e. a lower inertial load generally permits faster response and higher bandwidth). In this connection, it is noted, as mentioned above, that for most types of high-performance beam steerers, the steerer configuration inherently dictates the selection of a mirror deflection axis which is external to the mirror and, hence, is remote from the center of gravity of the mirror. Indeed, for steerers where the mirror is mounted transversely at the tip of a bender serving as a mirror driver, the effective axis for mirror deflection is halfway down the bender.

To provide a highly stable pivot axis for the mirror, a presently preferred implementation of the invention utilizes two "lambda supports" located at opposite ends of the mirror. The lambda supports are aligned to have a common pivot axis, and the center of gravity of the mirror is located on that axis. This configuration, which looks somewhat like a sawhorse with a mirror on the crossbar, affords greater pivot axis stability by providing supporting forces at either end of the mirror and allows slender, highly flexible leg sections to be employed without introducing undue susceptibility to side-to-side swaying.

A further desirable feature of a beam steerer according to the invention is its adaptability to provide a large beam deflection range. With the preferred driver-pivot arrangement, a lever action results which transforms driver movement into mirror rotation ... and the distance between the pivot axis and the line of action for the driver force can be adjusted to achieve a desired angular deflection range (see U.S. Pat. application Ser. No. 508,775, filed Sept. 23, 1974, now U.S. Pat. No. 3,981,566). With the presently preferred configuration described below, optical deflection ranges of around twenty degrees have been achieved at a bandwidth of 1 KHz.

The invention will be described with reference to the figures, wherein:

FIG. 3 is a perspective view of a beam steerer, according to the invention, having two flexible support members;

FIG. 4 is a perspective view of a presently preferred implementation of the invention; and FIG. 5 is a cross-sectional view taken along the line 5—5 indicated in FIG. 4.

Figure 1:
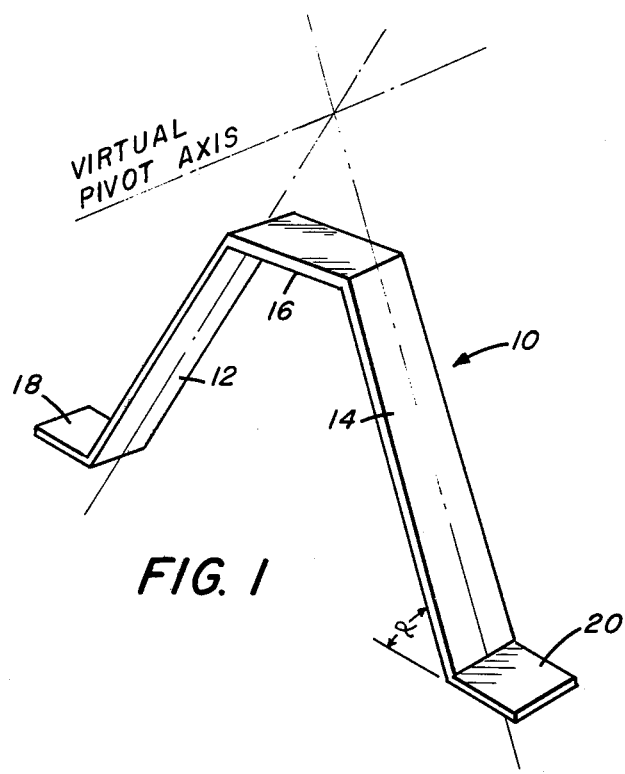
FIG. 1 is a perspective view of a flexible support member.

Referring to FIG. 1, a flexible support member 10 for use in a beam steerer has two flexible legs 12 and 14 which slant toward one another, preferably at an angle (α) of around 45°. Before coming to a vertex, the converging ends of legs 12 and 14 are truncated by an interconnecting section 16. Tabs 18 and 20 at the diverging ends of legs 12 and 14, respectively, are fixed, giving the support member 10 a degree of rigidity to resist translational motion. With this arrangement, the support member 10 exhibits a tendency to pivot about the intersection of the longitudinal leg axes (that intersection is denoted "virtual pivot axis" in FIG. 1) when subjected to a torque. Low resistance to pivoting about the virtual pivot axis is achieved with such members by using long slender legs of a flexible material, such as spring steel.

Figure 2:
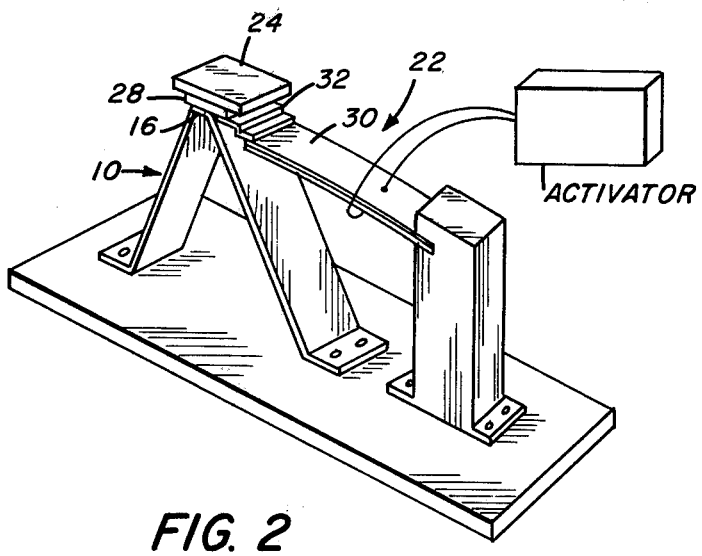
FIG. 2 is a perspective view of a beam steerer, according to the invention, having one flexible support member.

Now referring to FIG. 2, a beam steerer 22 is shown which utilizes a single flexible support member 10 of the type described above. A mirror 24 is mounted to the interconnecting section 16 of the member 10 by means including a spacer 28. Preferably, the mirror is bonded by an adhesive to spacer 28 which is in turn bonded to interconnecting section 26 of member 10.

By sizing spacer 28 to locate the mirror center of gravity near the virtual pivot axis of member 20, as is preferred for implementing the invention, a reduced inertial resistance to deflection of the mirror results. This is because the load mass, which is mainly the mass of the mirror, is caused to be more concentrated about the pivot axis. If the mass of the spacer 28 is significant, then it is the center of gravity of the spacer-mirror composite that should be arranged on the virtual pivot axis to minimize rotational inertia. As was mentioned above, the fact that the pivot is virtual allows the back surface of the mirror to be used for mounting purposes, while still allowing the pivot axis to pass through the mirror. With the described supports, it should be appreciated that there is no physical obstruction (such as a hinge pin) along the pivot axis.

A driver 30 is coupled to apply torque for rotating the mirror. Preferably, a bender-type driver is used and coupling is effected by means of a flexible hinge 32 which connects the driver to the spacer 28.

Referring to FIG. 3, a particularly stable mirror support arrangement utilizes two flexible support members 10′ and 10″ which are spaced apart and have alined virtual pivot axes. A spacer bar 40 extends between the members 10′ and 10″ and supports a mirror 42. The thickness of the spacer bar 40 is selected to locate the center of gravity for the spacer bar-mirror composite close to the common pivot axis of support members 10′ and 10″. To drive the mirror for deflecting incident light rays, a driver 44 is coupled to the spacer 40 by a hinged drive link 46.

Referring now to FIG. 4, a preferred arrangement for coupling torque to beam steerers of the type described with reference to FIG. 3 utilizes one or more flexible metal drive links 50 which are attached to the mirror side of connecting bar 40 (shown in detail in FIG. 5). With this arrangement, the drive links 50 can have a line of action perpendicular to the interconnecting sections of the members 10′ and 10″, while being essentially tangent to circles centered on the virtual pivot axis. The significance of this alignment is that all of the driver force contributes to the desired rotational motion. Or, put another way, for a line of action tangent to a circle centered on the pivot axis, there is no force component in the direction of the pivot axis. Force in such direction is undesirable because it contributes to translational motion of the pivot axis.

It should be noted that a lever action is provided by the described drive arrangements to transform a translational driver motion to a rotational mirror deflection. By adjusting the distance between the line of action of the drive force and the virtual pivot axis, the angular range of the steerer deflection may be customized. With the presently preferred implementation utilizing a bimorph bender driver, optical deflections over a range of 20° have been achieved.

The invention has been described in detail with reference to presently preferred implementations thereof. It will, however, be appreciated that modifications and variations within the spirit and scope of the invention will be suggested to those skilled in the art. For example, various types of drivers, including magnetostrictive and extender-type drivers, may be employed. Also, a variety of flexible materials may be employed in producing the flexible support members, and such members need not be made in one piece.

What is claimed is:

1. A beam steering apparatus comprising:
   a. a mirror;
   b. at least one support having a pair of flexible leg sections that are angled toward one another and are truncated by an interconnecting section extending therebetween, said leg sections having respective longitudinal axes which are arranged to intersect at a vertex;
   c. means for fixing in place the diverging ends of said leg section sections;
   d. means for fastening the said mirror on the vertex side of said interconnecting section; and
   e. drive means for transmitting to said support a component of torque about the vertex of said longitudinal axes whereby said leg sections are caused to flex for effecting a rotation essentially about said vertex.

2. An apparatus according to claim 1 wherein said fastening means includes means for spacing said mirror from said interconnecting section a distance preselected to locate the center of gravity of said mirror substantially at the vertex of said longitudinal axes.

3. An apparatus according to claim 1 wherein two such mirror supports are arranged at opposite sides of said mirror for support thereof.

4. An apparatus according to claim 3 wherein said fastening means includes a support beam which is attached to the mirror and is mounted to the interconnecting sections of the two mirror supports.

5. An apparatus according to claim 4 having a bender-type driver which is connected to said support beam by a drive link arranged at right angles to the plane of said mirror and hinge-connected adjacent to said mirror.

6. A mounting for the mirror of a beam steerer, such mounting comprising:
   a. at least one support having a pair of elongate flexible leg sections slanting toward one another, which leg sections are truncated by an interconnecting section extending therebetween, the longitudinal axes of said leg sections being arranged to converge in a vertex;
   b. means for securing in place the diverging ends of said leg sections to define a substantially fixed rotary axis for said support which passes through said vertex; and
   c. means for fastening such a mirror on the vertex side of said interconnecting section.

7. An apparatus according to claim 6 wherein said fastening means includes means for spacing the mirror from said interconnecting section a distance preselected to locate the center of gravity of the mirror-spacer means combination near said vertex, whereby the inertial resistance to rotation about said vertex is reduced.

8. A mounting according to claim 6 wherein there are two of said supports which are arranged with the longitudinal leg axes thereof intersecting with a common rotary axis at spaced apart vertex points, the leg axes being perpendicular to such rotary axis, and wherein said fastening means includes a) a support crossmember attached to and extending between the interconnecting sections of said two supports, and b) spacer means for fastening said mirror to said crossmember and for spacing said mirror from said crossmember at a distance preselected to locate a center of rotation for the mirror on said rotary axis to thereby reduce inertial resistance to mirror rotation.

9. An apparatus according to claim 8 wherein said leg sections are of substantially rectangular cross section and have a relatively large cross-sectional dimension in the direction parallel to said rotary axis.

* * * * *